Feb. 10, 1959  G. V. ABBOTT  2,872,736
TOOL SETTING GAGE FOR BORING MACHINES AND THE LIKE
Filed Oct. 17, 1955
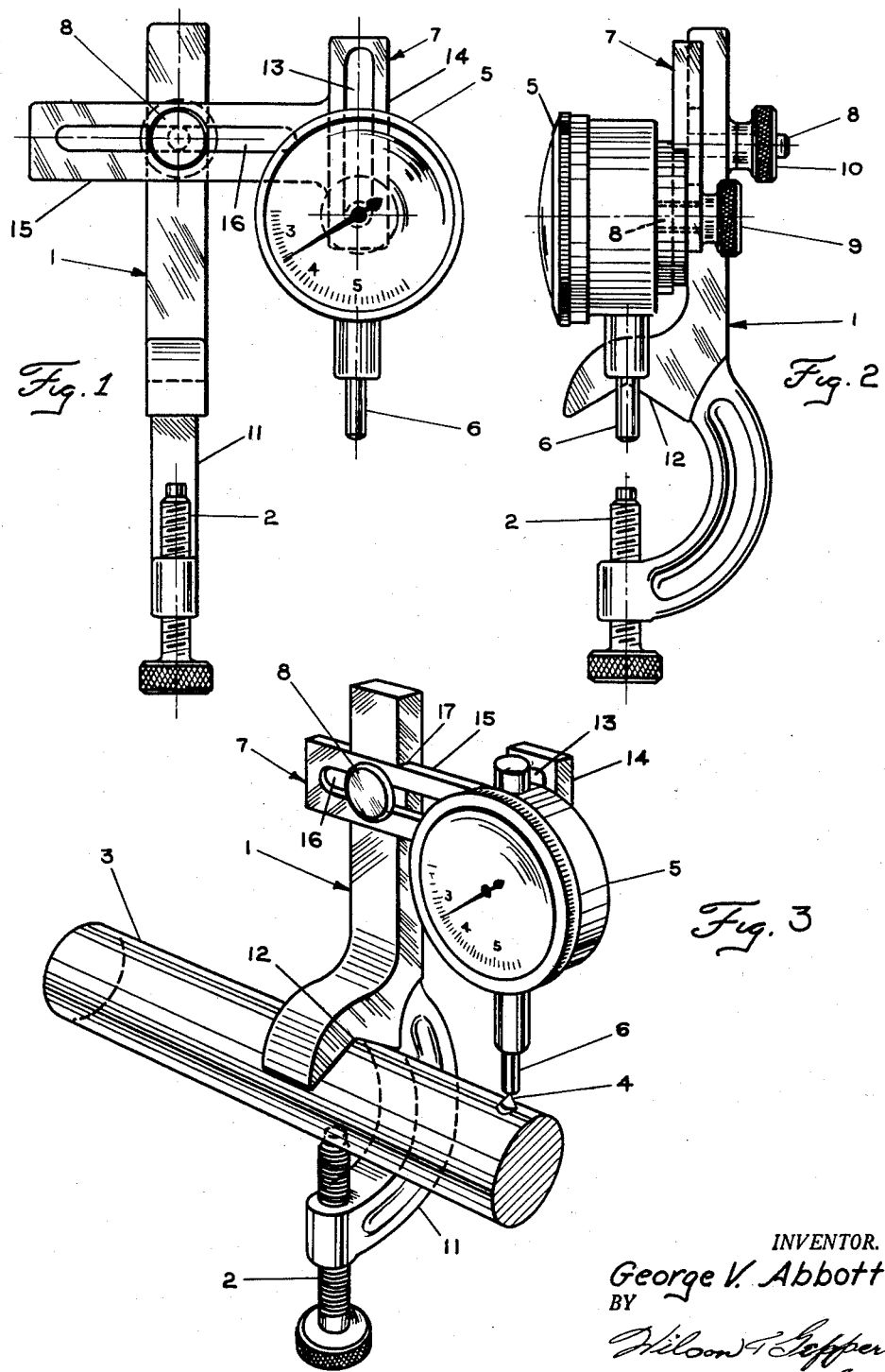
INVENTOR.
George V. Abbott
BY
Wilson & Geppert
Atty's.

2,872,736

TOOL SETTING GAGE FOR BORING MACHINES AND THE LIKE

George V. Abbott, Woodstock, Ill.

Application October 17, 1955, Serial No. 540,774

1 Claim. (Cl. 33—172)

The present invention relates to a tool setting gage and more particularly to a novel device for accurately adjusting the cutting tool or tool tip of a boring bar, arbor or spindle to the diameter of the counterbore or size of the opening to be bored.

Among the objects of the present invention is the provision of a novel tool setting gage assembly, including a clamping bracket, supporting frame or fixture beam that may be easily and quickly mounted upon and anchored to a boring bar or arbor and a gage capable of being accurately adjusted on this clamping bracket or frame radially or vertically as well as axially of the boring bar or arbor, to thereby support a dial indicator having an indicating spindle the free end of which is adapted to contact the cutting edge of the tool bit to facilitate accurate adjustment thereof to the diameter or size of the opening or bore to be formed.

The present invention further comprehends a novel setting gage for adjustably supporting a dial indicator on the boring bar or arbor of a boring or other cutting machine in such manner as to effect accurate adjustment of the tool and determination of the diameter of the counterbore or size of opening to be cut by said tool.

Another important object of the present invention is the provision of a tool setting gage having a novel clamping bracket or supporting frame for anchoring the assembly to a boring bar, arbor or spindle at a point spaced from the cutting tool or tool bit, and an indicator that is readily adjusted axially and radially of the boring bar or arbor carrying the tool tip or bit, for accurately determining the movement of the tool and the setting thereof to bore a predetermined size opening.

A further important object of the present invention is the provision of a novel clamping bracket or supporting frame for a dial indicator having a spindle adapted to contact and determine the setting of a cutting tool carried by a boring bar or arbor, and for accurately adjusting said tool to a predetermined diameter of a bore or opening to be cut, said clamping bracket or supporting frame having a substantially U-shaped groove providing a seat for locating and positioning the bar or arbor in the bracket or frame in such manner that the axis of the bar or arbor is disposed in alignment with the axis of the spindle of the indicator, and clamping means for anchoring the bar or arbor centered in the supporting bracket or frame.

Further objects are to provide a construction of maximum simplicity, efficiency, economy and ease of assembly and operation, and such further objects, advantages and capabilities as will later more fully appear and are inherently possessed thereby.

The invention further resides in the construction, combination and arrangement of parts illustrated in the accompanying drawing, and while there is shown therein a preferred embodiment, it is to be understood that the same is susceptible of modification and change, and comprehends other details, arrangements of parts, features and constructions without departing from the spirit of the invention.

In the drawing:

Figure 1 is a view in front elevation of the novel setting gage device.

Fig. 2 is a view in side elevation thereof.

Fig. 3 is a view in perspective of the novel setting gage device mounted in operative position on a boring bar, arbor or spindle.

Referring to the disclosure in the drawing and more particularly to the novel illustrative embodiment selected to disclose the present invention, the novel setting gage assembly comprises a supporting bracket, frame or fixture beam 1 having an adjustable clamping screw 2 for securely or rigidly clamping the supporting bracket, frame or fixture beam upon a boring bar, arbor or spindle 3 to accurately gage a boring tool bit 4 on the boring bar, arbor or spindle 3.

To facilitate locating and positioning the supporting bracket, frame or fixture beam 1 upon the boring bar, arbor or spindle 3, the body 11 of the former is contoured to readily receive boring bars, arbors or spindles 3 of different diameters and provided with a substantially V-shaped groove or seat 12 for accurately positioning the setting gage assembly upon the boring bar, arbor or spindle and retaining it by the adjustable clamping screw 2.

The novel setting gage assembly includes a dial indicator 5 having a depending indicating spindle 6 adapted to contact the tool or bit 4 and with the substantially V-shaped or angle seat 12 accurately positioning the boring bar, arbor or spindle 3 within the clamping bracket 1 and locating the center line of this indicating spindle 6 to the center line of the boring bar, arbor or spindle 3.

The dial indicator 5 and its indicating spindle 6 are readily adjustable both axially and radially of the boring bar, arbor or spindle 3 to locate the free end of this indicating spindle 6 in position to adjust the tool or tool bit 4 to the accurate diameter or size of the counterbore or opening to be formed in the work pieces being bored. To provide for such axial and radial adjustment, there is provided a supporting bracket 7 for the dial indicator 5, the latter having a clamping bolt 8 received in an elongated slot 13 in a vertical arm 14 on the supporting bracket 7 for radial adjustment. To provide for axial adjustment along the boring bar, arbor or spindle 3, the supporting bracket 7 is also provided with a horizontally disposed arm 15 having a longitudinally extending or elongated slot 16.

In each slot 13 and 16 of the arms 14 and 15, respectively, of the supporting bracket 7 is received a clamping bolt 8 with these clamping bolts retained by the tightening of knurled clamping nuts 9 and 10, respectively. Thus the dial indicator 5 and its spindle 6 with the clamping bolt 8 projecting rearwardly from the back of the indicator housing, is vertically or radially adjustable in the slot 13 relative to the axis of the boring bar, arbor or spindle 3 and its tool bit 4, and the supporting bracket 7 through adjustment of its arm 15 slidably within a conforming transverse groove or slot 17 in the face of the vertical projection of bracket 1 is adjustable along the axis and longitudinally of the boring bar, arbor or spindle 3 and the tool bit 4.

In the disclosed illustrative embodiment of the drawing, the dial indicator 5 is of the type that is calibrated in thousandths of an inch with each thousand divided into tenths so that accurate adjustment to one ten-thousandths of an inch is provided for. Thus the present novel setting gage assembly is capable of use on substantially all types of boring tools as the clamping bracket or fixture beam can be located at a sufficient distance from the cutting edge of the tool or tool bit to permit access to the adjusting bolts or screws 8 and their knurled clamping nuts 9 and 10 with the tools mounted at an angle to the bar, arbor or spindle 3.

The radial adjustment will accommodate substantially all small tooling in automatic boring machines, and by employing an indicator 5 calibrated in one ten-thousandths which provides for great sensitivity, the indicator spindle 6 will not harm the cutting edge of any of the various tools capable of being employed and permits a movement of one ten-thousandths of an inch to be easily made in the act of adjusting the cutting tool for the diameter of the counterbore or cut to be made in the work pieces.

In the assembly and operation of the present setting gage device upon the bar, arbor or spindle 3 of a boring machine or other machine with which the present device is susceptible of use, the indicator 5 is first raised radially or vertically in the slot 13 of the vertical arm 14. Next, the clamping bracket or fixture beam 1 is mounted in operative position on the boring bar, arbor or spindle 3 at a convenient distance from the cutting tool where it is rigidly held by the clamping screw 2. The indicator spindle 6 is then brought into contact with the tip of the tool or bit 4 by adjusting the dial indicator 5 laterally and vertically or radially in the indicator bracket 7 through manipulation of the knurled clamping nuts 9 and 10.

As the setting gage has a relatively large range of adjustment, it is equally adaptable to different types of tools including setting fly cutters in counterboring tools, boring tools in turret lathes, checking eccentricity of bushings over a plug gage, etc., and by using the angle attachment it is also adaptable to tools mounted at an angle including the setting of facing tools for depth when they are mounted in conjunction with boring tools. In fact, the present setting gage is highly useful for machinists, tool makers as well as for set-up men on boring machines.

When the indicator spindle 6 is moved into contact with the tool tip or bit 4 by slidably adjusting the indicator 5 in the radial or vertical slot 13 in the arm 14 of the bracket 7 and thereat anchoring the indicator in adjusted position by tightening its clamping nut 9, an accurate indicator reading of the tool movement is effected or determined.

Having thus disclosed the invention, I claim:

A tool setting gage for accurately gaging and adjusting a cutting bit mounted on an arbor for cutting an opening of a predetermined diameter in a work piece, consisting of a clamping bracket to be clamped about the arbor and provided with a substantially V-shaped groove for accurately locating the arbor in centered position in said bracket, a clamping screw carried by the bracket in position for seating and retaining the arbor in said groove, a vertical projection on said bracket provided with a transverse slot in its face, a dial indicator for indicating the adjustment of the cutting edge of said bit and provided with a spindle having a free end adapted to contact the cutting edge of the bit for accurately locating the position of said cutting edge, the axis of the arbor being centered in relation to the axis of the indicating spindle when the arbor is located in said groove, a supporting bracket for supporting the indicator and its spindle in operative position on but spaced laterally of said clamping bracket including a flat arm horizontally and conformably received and adjustable transversely in the slot of the projection of said clamping bracket and axially of said arbor and an arm for adjustably mounting said indicator and spindle radially of said arbor, means for anchoring said first mentioned arm of said supporting bracket in adjusted position in the slot on said clamping bracket and means for anchoring the indicator and its spindle in adjusted position on said second mentioned arm whereby said indicator and its spindle are adjustable both radially and axially of said arbor.

References Cited in the file of this patent
UNITED STATES PATENTS

| | | |
|---|---|---|
| 1,029,390 | Milewski | June 11, 1912 |
| 1,047,511 | Freeman | Dec. 17, 1912 |
| 1,825,988 | Wochner | Oct. 6, 1931 |
| 2,616,184 | Mendro et al. | Nov. 4, 1952 |
| 2,680,300 | Ruggles | June 8, 1954 |